Dec. 2, 1947.  M. N. FAIRBANK  2,431,926
MOLD FOR USE IN THE MANUFACTURE OF OPTICAL ELEMENTS
Filed Sept. 2, 1942
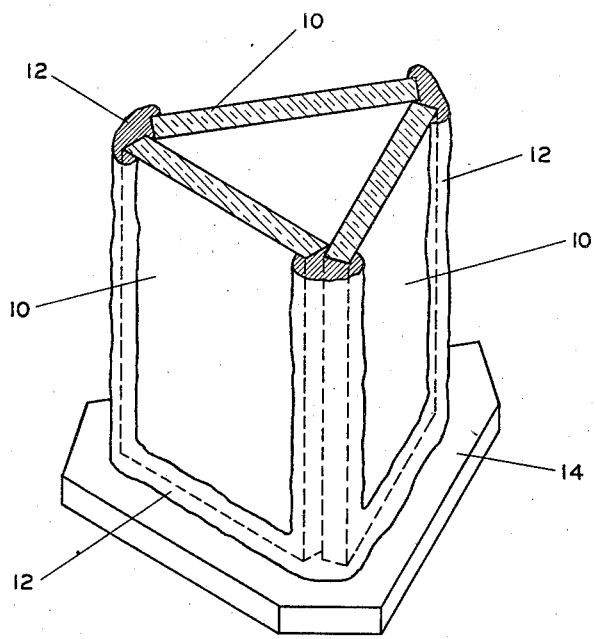
Murry N. Fairbank
INVENTOR
BY Donald L. Brown
Attorney Patented Dec. 2, 1947

2,431,926

UNITED STATES PATENT OFFICE 2,431,926

MOLD FOR USE IN THE MANUFACTURE OF OPTICAL ELEMENTS

Murry N. Fairbank, Weston, Mass., assignor to Polaroid Corporation, Cambridge, Mass., a corporation of Delaware Application September 2, 1942, Serial No. 457,030

5 Claims. (Cl. 18—39)

This invention relates to an improved mold for use in the manufacture of optical elements formed of polymerized synthetic plastics, resins and like materials.

An object of the invention is to provide a mold of the character described comprising a plurality of elements having optically smooth surfaces for molding the light-transmitting faces of a plastic optical element and a metal alloy having a relatively low melting point to seal the joints between said molding elements and hold them fixedly in position during the molding process.

Other objects of the invention are the provision of a bonding alloy which may be applied in fluid condition to the molding elements and which sets up no strain therein as it hardens or solidifies; the provision of such an alloy which remains solid at temperatures employed in the polymerization of a plastic optical element in the mold, but which softens and fuses at temperatures not greatly in excess thereof, the provision of such an alloy having no contraction or expansion at the temperature and during the period at which it solidifies; the provision of such a bonding material which provides an air-tight seal; and the provision, in a mold of the character described, of a bonding alloy of bismuth and lead.

Other objects of the invention will in part be obvious and will in part appear hereinafter.

The invention accordingly comprises the product possessing the features, properties and relation of elements which will be exemplified in the following detailed disclosure and the scope of the application of which will be indicated in the claims.

For a fuller understanding of the invention, reference should be had to the following detailed description, taken in connection with the accompanying drawing, which represents partially in perspective and partially in section one embodiment of the invention.

There is a pressing demand for large quantities of optical elements such as prisms, lenses and the like, primarily because of the enormously increased requirements of the armed forces. It has been suggested that such optical elements be molded from synthetic plastics and the like, for example by polymerizing the plastic material in a suitable mold. Materials which have been found particularly useful in the production of such molded plastic optical elements are cyclohexyl methacrylate, styrene, methyl methacrylate and similar plastics. These materials are introduced into the molds in the monomeric form, or partially polymerized, and the polymerization is carried forward substantially to completion.

It will be apparent that a satisfactory mold must be readily and rapidly made, it should preferably be easily removed from the finished molded article, it should comprise elements and materials which can be repeatedly re-used, as molds are expensive, and its molding elements, i. e., those portions of the mold furnishing the optically smooth surfaces which are to be in contact with the light-transmitting faces of the molded element, should be free from all strain. Furthermore the mold should, necessarily, withstand any temperature to which it may be subjected during polymerization of the plastic optical element. With plastic materials of the class heretofore mentioned preferred polymerization temperatures are maintained at not appreciably greater than 90 degrees C.

Heretofore, difficulty has arisen in the production of suitable molds, primarily in connection with the problem of maintaining the walls of the molds, i. e., the elements in contact with the optically important surfaces of the molded article, substantially free from strain. A preferred method of producing the molds has been to place the elements forming the mold walls, for example plates of glass or other suitable material having optically smooth molding surfaces, in a suitable jig. While the glass plates are held in position in the jig they are sealed along their adjacent edges and cemented together by any suitable cement, for example a metal or an alloy having preferably a relatively low melting point. Heretofore, strain has been set up in the mold walls and the molding surfaces at least slightly distorted because of contraction or expansion of the cement employed at the moment of its setting or hardening.

It is a principal object of this invention to provide in molds of the character described a sealing and bonding material which has substantially no expansion or contraction at the temperature at which it sets or hardens.

A preferred embodiment of the invention is shown in the drawing, which illustrates in perspective and in section a mold for a triangular prism. It is, of course, to be understood that the invention is not limited to molds for prisms or optical wedges, but is applicable to molds for other optical elements as well. In the drawing, the mold walls are shown at 10 as comprising glass plates having optically smooth inner surfaces. These elements are sealed and cemented in position by the low melting point cement 12 which is preferably an alloy or a metal having substantially no expansion or contraction at the temperature at which it hardens. A suitable material for use as the cement 12 is the material sold commercially as Belmont Brand No. 255 Low Melting Alloy Solder by Belmont Smelting and Refining Works, Inc., of Brooklyn, New York, an alloy of bismuth and lead in the proportions of substantially five parts of bismuth to four parts of lead. Any other material possessing similar properties may be employed as the cement 12. The bottom of the mold is sealed with a suitable plate 14.

A mold of the character described may be readily assembled, it will satisfactorily withstand the polymerization temperatures of the plastics employed in forming the desired molded optical elements, it may be readily removed from the molded article by melting or softening the cement by means of locally applied heat, and the light-transmitting surfaces of the molded article are true and free from any distortion, because no strain is imparted to the mold walls as the cement hardens.

Since certain changes may be made in the above product and different embodiments of the invention could be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A mold comprising, in combination, a plurality of wall elements, and a fusible cement bonding said elements together, said cement comprising an alloy of approximately four parts of lead and five parts of bismuth and having substantially zero expansion and contraction at the temperature at which it solidifies.

2. A mold comprising, in combination, a plurality of wall elements of optically smooth glass, and a fusible cement bonding said elements together, said cement having a melting point not greatly in excess of the maximum temperature at which said mold is used and comprising a metal and having substantially zero expansion and contraction at the temperature at which it solidifies.

3. A mold for use in the formation of prisms of polymerized synthetic plastic material comprising, in combination, a plurality of angularly positioned mold walls of optically smooth glass and a cement bonding said walls together and comprising a metallic alloy having a melting point not greatly in excess of the maximum temperature at which said mold is used and having substantially zero expansion and contraction at the temperature at which it solidifies, said mold walls being substantially free from strain.

4. A mold comprising, in combination, a plurality of elements, at least one of said elements being formed of glass and defining a surface of the mold cavity, and a fusible cement bonding said elements together, said cement comprising an alloy of approximately four parts of lead and five parts of bismuth and having substantially zero expansion and contraction at the temperature at which it solidifies.

5. A mold for use in the formation of an optical element of polymerized synthetic plastic material, comprising, in combination, a plurality of members, at least one of said members being formed of optically smooth glass and adapted to define a light-transmitting surface of said element, and a fusible cement bonding said members together, said cement comprising an alloy of approximately four parts of lead and five parts of bismuth and having substantially zero expansion and contraction at the temperature at which it solidifies.

MURRY N. FAIRBANK.

REFERENCES CITED

The following references are of record in the file of this patent:

UNITED STATES PATENTS

| Number | Name | Date |
|---|---|---|
| 2,079,393 | Benge | May 4, 1937 |
| 2,154,639 | Rohm et al. | Apr. 18, 1939 |
| 1,113,009 | Howard et al. | Oct. 6, 1914 |
| 1,475,764 | Frederick | Nov. 27, 1923 |
| 2,304,664 | Smith | Dec. 8, 1942 |